United States Patent Office 3,518,228
Patented June 30, 1970

3,518,228
SYNTHETIC CROSS LINKED POLYMERS
Brian Nixon, Leeds, and Leslie Nathan Phillips, Farnborough, England, assignors to National Research Development Corporation, London, England
No Drawing. Continuation-in-part of application Ser. No. 427,455, Jan. 22, 1965. This application Sept. 11, 1967, Ser. No. 666,968
Int. Cl. C08f *19/00;* C08g *33/10*
U.S. Cl. 260—47                                8 Claims

ABSTRACT OF THE DISCLOSURE

A process for the manufacture of a cross-linked polymer which comprises heating at a temperature of between 150° C. and 400° C., a polymer having aromatic nuclei with replaceable nuclear hydrogen atoms with an aralkyl ether selected from the group consisting of p-di(methoxy)-xylylene and 4,4'-di(methoxy methyl) diphenyl ether in contact with a catalytically effective amount of a Friedel-Crafts type catalyst to eliminate hydrogen atoms from aromatic nuclei of said polymer and methoxy groups from said aralkyl ether as methanol whereby a cross-linked polymer is produced with the remaining part of the aralkyl ether cross-linked directly between aromatic nuclei in the polymer.

---

The present invention relates to synthetic cross-linked polymeric materials and their manufacture and is a continuation-in-part of our earlier application Ser. No. 427,455 filed on Jan. 22, 1965 now abandoned.

Many properties of polymers such as hardness, mechanical strength, and resistance to chemical attack are greatly dependent upon the extent of polymerisation of the polymer, and many polymers only display these desirable properties if their molecular weight is sufficiently high. Generally the attainment of a high molecular weight in a polymer is assisted by the formation of a cross-linked network of polymer chains.

Cross-linking reactions of this type are generally difficult to control and tend to go to completion and form insoluble, infusible and intractable polymers which are not readily fabricated.

The present invention provides an improved process for cross-linking polymeric materials under mild reaction conditions to produce highly cross-linked materials having great inertness and stability and some or all of the aforementioned desirable properties, in which process a wide range of both organic and inorganic polymers may be used as starting materials provided that the polymer has aromatic nuclei incorporated either pendant on or in the polymer chain. In particular, highly cross-linked polymeric aromatic materials of high thermal stability can be produced which variously have high adhesion to fibre surfaces and are non-corrosive to metals.

The polymer to be cross-linked should be tractable, that is to say readily obtained in the liquid phase by melting or dissolving in a solvent and normally is a relatively low molecular weight polymer generally having an average molecular weight of less than about 20,000 and having a degree of polymerisation between about 5 and 15 with an insignificant amount of cross-linking.

Hitherto highly cross-linked aromatic polymeric compounds have been generally formed by means of a reactive compound having an activated aromatic group or an activated substituent on an aromatic group.

In accordance with the present invention, a process for the manufacture of a cross-linked polymer comprises treating a polymer that contains aromatic nuclei having replaceable nuclear hydrogen atoms with an aralkyl ether that has at least two methoxymethyl groups each attached to an aryl group to eliminate as methanol hydrogen atoms from aromatic nuclei in the polymer and methoxy groups from the aralkyl ether, whereby a cross-linked polymer which will be normally highly cross-linked is produced with the remaining part of the aralkyl ether cross-linked directly between aromatic nuclei in the polymer.

Throughout the specification "polymer" and "cross-linked polymer" have the meanings given to them on pages 1 and 3 respectively of the 1st edition of "Principles of High Polymer Theory and Practice" by Schmidt and Marlies.

The process may be carried out readily under mild reaction conditions, in the presence of a Friedel-Crafts type catalyst, at moderately elevated temperatures of between about 150° C. and 400° C. whereupon the methanol produced is driven off as a gas and may be condensed outside the reaction system. In contradistinction to the approximately molar proportions in which Friedel-Crafts type catalysts are used in certain Friedel-Crafts reactions, in processes in accordance with the invention only a minor proportion, less than 10 % w./w. and normally of the order of 1% w./w., of a Friedel-Crafts type catalysts is a catalytically effective amount which is required to be present in order that the reaction proceeds at a practical rate. Of the wide range of well-known Friedel-Crafts type catalysts available, stannic chloride and ferric chloride have been found to be the most useful. Normally, effective results are obtained when stannic chloride or ferric chloride is present in the reaction mixture in a concentration of ½–2% w./w. Stannic chloride is often conveniently added to a reaction mixture, as a solution of about 10% w./w. or less in an organic solvent such as 1,2-dichloroethane. Throughout the specification percent w./w. or even percent of the Friedel-Crafts type catalyst refers to the percent by weight based on the total weight of the reactants.

Pressure may be applied, for instance when forming in a mould or press, but it is not essential for the success of the process.

The aralkyl ether is conveniently described as the cross-linking agent. A cross-linking agent that reacts with a wide range of polymers is p-di(methoxy)xylylene. 4,4'-di(methoxymethyl) diphenyl ether or its isomers may also be used. If the methoxymethyl group is replaced by any other alkoxymethyl group the reaction becomes considerably less facile as the homologous series is ascended and above the butoxymethyl group the reaction does not go at all under normal conditions.

The extent of cross-linking can be readily controlled by varying the amount of cross-linking agent to produce, if desired, an intractable highly cross-linked polymer having high chemical inertness and thermal stability.

The cross-linking process in accordance with the invention involves elimination of hydrogen from the aromatic nuclei of the polymer in combination with the methoxy group from the cross-linking agent as methanol. An important feature of the process is that cross-linking may take place effectively with any polymers having aromatic nuclei that contain only hydrogen atoms and no reactive substituents as has been considered necessary hitherto. A further important feature of the invention is that the substance eliminated from the polymer in the final cross-linking stage is non-corrosive and therefore processes in accordance with the invention can be used to produce materials for use as insulating varnishes, surface coatings and adhesives in conjunction with both metals and plastics without attack taking place upon the metal.

It has also been found that the present process may produce polymeric materials which are thermally stable up to about 250–300° C. and hence have greater thermal stability than established commercial products, for example, those based upon phenol and formaldehyde.

The cross-linking process may be applied extensively to the wide range of polymeric materials that contain aromatic nuclei. The aromatic nuclei may be either pendant on or in the polymeric chain and are advantageously unsubstituted benzene-type nuclei and although substituent groups may be present they must not be strongly electron-withdrawing groups, that is nitro or halogeno groups. Other type of aromatic nuclei that may be used include, ferrocene, thiophene, furan and some nitrogen-containing heterocycles.

The aromatic nuclei that are used in the cross-linking process may be, firstly, part of the backbone of the polymeric chain or they may be, secondarily, pendant aromatic nuclei attached thereto either directly or through some other group.

Examples of the first type of relatively low molecular weight polymers include polyesters, for example, those obtained from terephthalic acid and polyphenyl glycols, and polymers consisting of alternate phenylene and methylen groups such as are obtained from benzyl chloride when it is treated with stannic chloride under Friedel-Crafts reaction conditions. The second type may include phenyl siloxanes, polystyrenes and related compounds.

The invention is particularly applicable to the production of highly cross-linked intractable polymers in two stages. In the first stage a compound containing at least one aromatic nucleous is partially polymerised to a relatively low molecular weight polymer which is still tractable. This stage comprises heating an aromatic compound with an aralkyl ether cross-linking agent at a temperature between about 80° C. and 250° C. to eliminate methanol substantially as hereinbefore described for cross-linking reactions to produce a relatively low molecular weight polymer by interlinking the aryl part of the cross-linking agent between aromatic nuclei in different molecules of the compound. In the second stage the reaction is carried out as previously described for the cross-linking of a relatively low molecular weight polymer to a highly cross-linked intractable polymer.

Alternatively, the cross-linking agent used in the first stage of a two-stage polymerisation process may be a di(halogenomethyl) aromatic compound where halogeno excludes fluoro (for example, p-dichloroxylene) so that by the first stage reaction a relatively low molecular weight polymer is produced with hydrogen halide as the other reaction product as fully described in U.S. Pat. No. 3,423,335. Generally, di(halogenomethyl) compounds are more active cross-linking agents than the coresponding di(methoxymethyl) compounds under the same conditions so that by using a halogenomethyl cross-linking agent a faster first stage reaction is possible. Also di(halogenomethyl) compounds are usually cheaper and more readily obtainable than the corresponding (methoxymethyl) compounds and often a catalytically effective amount of a Friedel-Crafts type catalyst need not be used. The second stage reacton is then performed as previous described, with a di(methoxymethyl) compound as cross-linking agent so that methanol rather than hydrogen chloride is required to be liberated while the final cross-linked product is being formed.

For the most advantageous use of the two stage process the first stage (whichever cross-linking agent is used) should be arranged to proceed as near as possible to the gelling point to reduce the amount of reaction necessary in the second stage. This may be done either by stopping the reaction at the required stage, for instance, by cooling or by using a carefully regulated amount of cross-linking agent. In this way the second stage, cross-linking reaction is shortened and the amount of methanol to be liberated is reduced.

Compounds to which the two-stage process can be applied must contain at least one aromatic nucleus that is not substituted with a strongly electron-withdrawing group and include such compounds as lower polyphenyls, such as diphenyl, terphenyl and quaterphenyl, fused ring aromatic hydrocarbons (e.g. naphthalene and triphenylene), aryl or phenyl esters of inorganic acids (e.g. triphenyl phosphate), low molecular weight aryl siloxanes (e.g. octaphenylcyclotetrasiloxane), aryl substituted borazoles (e.g. N-triphenylborazole) and metallocyclo-pentadienyl sandwich compounds (e.g. ferrocene).

Also the aromatic polymeric resin to be cross-linked or the aromatic compounds to be polymerised to a tractable resin and then cross-linked in a two-stage process in accordance with the invention may be advantageously a mixture or blend of aromatic polymeric resins or aromatic compounds respectively. In this way, technological defects of particular resins may be overcome or a product provided having certain desired properties by blending a resin with one or more other resins in the process of manufacture. These resins which are cross-linked through the same cross-linking group, e.g. the xylylene group, are in general mutually soluble so that they readily blend and form a homogeneous film. If the resins to be blended are formed at a similar rate at a given temperature it may be convenient to produce a mixed resin by a single first-stage process, but in general this is not so and the tractable resins are far more readily prepared separately and the blend produced by simply mixing them together in a mutual solvent before the second stage cross-linking process.

Examples of compounds which can be treated with a di(halogenomethyl) or a di(methoxymethyl) compound to produce a tractable low molecular weight polymer which can be advantageously blended and then treated with a di(methoxymethyl) compound to produce a cross-linked resin are firstly octaphenylcyclotetrasiloxane with triphenyl phosphate and secondly diphenyl ether N-triphenyl borazole.

The process that produces a cross-linked intractable polymer may be carried out so as to produce an article consisting entirely of polymer. Also while the polymer is still tractable, it may be impregnated in a suitable fibrous material, for example, glass cloth or asbestos fibre mat, or silica fibrous material and final cross-linking carried out to produce a highly cross-linked polymer which is structurally reinforced with fibrous material. The process may also be used to form an article consisting of a metal structure which, for example, is enclosed by a layer of the cross-linked polymer or which contains a core of the polymer. In particular cross-linked intractable polymers in accordance with the invention may be used as heat-resistant insulating coatings on electrical conductors or as dielectric materials in capacitors.

Various examples of processes for preparing cross-linked resins in accordance with the invention will now be described together with practical examples of their use.

EXAMPLE 1

4 g. of linear polybenzyl resin made by the self-condensation of benzyl chloride was heated to its melting point, i.e. 80° C. One gram of p-(dimethoxy)xylylene was added to the melt followed by five drops of a 10% solution of stannic chloride. After 3 minutes of gentle heating the mass gelled. After completion of cure overnight at 200° C., the polymer gave the following weight losses on heating: at 300° C., 0.17% per hour; at 350° C. 1.1% per hour; at 400° C. 4.1% per hour; at 450° C. 11.75% per hour.

EXAMPLE 2

100 g. of a substantially linear polybenzyl resin, melting point 70° C. (prepared by self-condensation of benzyl chloride) was dissolved in 250 g. of 1,2-dichloroethane. 25 g. of p-di(methoxy)xylylene and 10 ml. of a 10% w./w. solution of stannic chloride in o-dichlorobenzene were added. The resultant solution of resin, cross-linking agent and catalyst was used to impregnate asbestos felts which after pressing for five hours at 200° C. gave hard strong laminates.

EXAMPLE 3

A resin was made by the condensation of terphenyl with p-dichloroxylylene, the molar ratio being 4 parts of terphenyl to 3 parts of p-dichloroxylylene. This resin was condensed almost to completion (80% of total HCl evolved). It was a weak thermoplastic substance.

4 g. of this resin were warmed together with 1 g. of p-di(methoxy)xylylene. Two drops of 10% stannic chloride solution were added. Methanol was evolved on heating and after a few minutes the mass gelled and was post-cured overnight at 200° C. A hard, strong, dark brown polymer was produced.

EXAMPLE 4

In Examples 4 and 5 two-stage processes are shown, in which a linear thermoplastic resin is made using p-di(methoxy)xylylene and Santowax R, a mixture of terphenyls, and this resin is subsequently cross-linked to form a hard infusible product.

The linear resin was made by heating 4 moles (460 g.) of Santowax R and 3 moles (246 g.) of p-di(methoxy)xylylene to a temperature of 180–200° C. Then 0.5 ml. of stannic chloride was added and methanol which was immediately evolved, was distilled off at 64–66° C. There appeared to be no further reaction after 98 ml. of methanol had been evolved (80% of the theoretical maximum possible), so the resin was poured into a tray. This linear resin was a pale yellow, transparent, brittle solid with a softening range of between 95° and 100° C.

Further amounts of p-di(methoxy)xylylene were added to this resin to bring the molar ratio of Santowax R to p-di(methoxy)xylylene up to 1 to 1.2, so that on heating it would gel. 40 g. of the linear resin were heated with 9.5 g. of the ether and on heating it gelled when 2 ml. of methanol had been evolved. This gelled resin was post-cured at 200° C. for 16 hours and on further heating at 400° C., the polymer lost 6% in weight in the first four hours and over the next twelve hours lost weight at the rate of 2.6% per hour.

EXAMPLE 5

A thermosetting resin was made by heating 230 g. of Santowax R (1 mole) and 197 g. (1.2 mole) of p-di(methoxy)xylylene with a little stannic chloride. After 54 ml. of methanol had been evolved the reactants were cooled. This was 80% of the maximum amount of methanol which could be evolved before gelation could occur. The resin was dissolved in 1,2-dichloroethane and used to impregnate asbestos felts. These felts were cured at 200° C., and 500 p.s.i. for 90 minutes. After giving them a post-cure at 200° C. overnight, a flexural strength of 25,500 p.s.i. was obtained.

The resin contents of these laminates was 41% by wt. and their density 1.39 g./cc. The flexural strength of laminates after heat-treatment at 240° C. for various lengths of time was also determined. The flexural strength of the laminates (at 240° C.) after 24 hours at 240° C. was 21,000 p.s.i.; after 100 hrs. at this temperature the value was 21,600 p.s.i.; while on cooling to room temperature after 100 hours at 240° C. the flexural strength was 25,300 p.s.i.

EXAMPLE 6

Asbestos felts, freshly impregnated with the terphenyl/p-di(methoxy)xylylene resin prepared as described in Example 4, were further treated with a 1% w./w. solution of stannic chloride in 1,2-dichloroethane. When these felts had dried they contained 2% by wt. of stannic chloride, (based on the resin content of the laminates, not the total laminate weight). These felts were stacked and cured in a press at 200° C. and 500 p.s.i. for one hour. The resultant board was left to cool to 100° C. under pressure, and was then post-cured for 24 hours at 200° C. A hard board was produced with no blisters. The flexural strength of this laminate was 30,300 p.s.i.

EXAMPLE 7

This example is of a two-stage process in which p-dichloroxylylene is used in the first stage as the linking agent.

A linear resin was made by reacting together one mole of diphenyl-diphenoxysilane, one mole of p-dichloroxylylene and 5 ml. of a 10% w./w. solution of stannic chloride in 1,2-dichloroethane as catalyst. To a solution containing 80 g. of this resin in 80 g. of 1,2-dichloroethane was added 20 g. of p-di(methoxy)xylylene and then this solution was used to impregnate asbestos felts, as described in Example 6.

After a pressing and curing treatment as described in Example 6, hard laminated boards were obtained.

EXAMPLE 8

Examples 8–11 are of two-stage processes, starting from diphenyl ether and using p-di(methoxy)xylylene as linking agent for both reaction stages.

A solution of a thermosetting resin was made as follows:
300 g. of diphenyl ether and 400 g. of p-di(methoxy)xylylene were dissolved in 400 g. of o-dichlorobenzene. 6 ml. of a 10% w./w. solution of stannic chloride in o-dichlorobenzene were added and the mixture was brought gently to the reflux temperature. Evolution of methyl alcohol began and the reaction was continued until 125 ml. of methanol distillate had been collected.

85 g. of the resin solution were diluted further with 290 g. of 1,2-dichloroethane. This dilute solution was used to impregnate felts of aluminium silicate fibre, weighing 53 g. After air drying, the felts were precured at 180° C. for 1¾ hours, stacked together and pressed at 625 p.s.i. for 3 hours at 240° C. and postcured for 24 hours at 200° C. followed by 48 hours at 240° C. A hard, strong laminate was formed having good electrical properties up to 350° C.

EXAMPLE 9

A syrupy thermosetting resin was made by reacting together without solvent, 600 g. of diphenyl ether and 800 g. of p-di(methoxy)xylylene under reflux. A distillate of methanol amounting to 225 ml. was collected. The catalyst used was 12 ml. of a 10% w./w. solution of stannic chloride in o-dichlorobenzene.

To 50 g. of this resin were added 40 g. of clay and 30 g. of chopped glass fibre. After thorough mixing a soft putty was obtained. This mixture was pressed into moulds and cured at 200° C. for 24 hours and post-cured for 24 hours at 240° C. A hard, strong, tough molded body was obtained which cauld be machined readily.

EXAMPLE 10

A resin syrup as in Example 9 was used to impregnate a thin sheet of asbestos paper. A resistance thermometer was made by embedding a fine nickel wire between two pieces of the impregnated asbestos paper and then curing under heat and slight pressure. A fluorinated ethylene/propylene film was used as a parting agent as this withstood the curing temperature 180–200° C. without distortion.

Under test the resistance thermometer survived a temperature rising to 450° C. for six minutes whereas a similar thermometer bonded with a conventional phenolic resin failed after 60 seconds with the temperature having risen only to 250° C.

EXAMPLE 11 p-Di(methoxy)xylylene may be used to join and then closs-link various different aromatic compounds by using a ratio of 1 mole of the aromatic compound to 1.5 moles of the ether, i.e. p-di(methoxy) xylylene. A 10% w/w solution of stannic chloride in dichloromethene is used as the catalyst unless otherwise stated.

(i) 0.8 g. of resorcinol was heated with 2 g. of the ether, and after the catalyst had been added the reactants set to a bright red thermoset solid.

(ii) 2.8 g. of octaphenylcyclotetrasiloxane was heated with 2 g. of the ether and with two drops of neat stannic chloride as catalyst. The mixture set a pale brown porous resin.

(iii) 1 g. of naphthalene, 2 g. of the ether and only one drop of the catalyst gelled on heating to a pale yellow solid.

(iv) 1.65 g. of triphenylene was heated with 2 g. of the ether and after adding five drops of the catalyst the reactants gelled to a yellow solid.

(v) 1.2 g. of diphenylene oxide (dibenzofuran) and 2.1 g. of the ether with only one drop of catalyst formed a very pale coloured gel after only slight heating.

(vi) 2.5 g. of triphenyl phosphate and 2 g. of the ether with only a litle catalyst formed a green-brown gel.

(vii) N-triphenyl borazole and B-phenyl-N-triphenyl borazole were each cross-linked with the ether in the presence of the catalyst.

(viii) 4 g. of carbazole and 4.2 g. of the ether were heated together. In a few moments the melt turned blue. Five drops of a 10% stannic chloride solution in o-dichlorobenzene were added and methanol was evolved. The melt turned grey then brown in colour and finally set to a porous mass.

We claim:

1. A process for the manufacture of a cross-linked polymer which comprises heating at a temperature of between 150° C. and 400° C p-dimethoxyxylene and a tractable low molecular weight polymer having an average molecular weight of less than 20,000 and having a degree of polymerization between about 5 and 15 which is selected from the group consisting of an aromatic polyester, a hydrocarbon polymer containing alternate phenylene and methylene groups, a phenyl poly siloxane, a polystyrene, a polymer containing fused ring aromatic nuclei, a polymer containing lower polyphenyl residues, a polymer-ion-containing ferrocene residues, a polymer containing thiophene residues, a polymer containing furan residues, a polymer containing triphenyl phosphate residues, and a polymer containing phenyl borazole residues, in contact with a catalytically effective amount of a Friedel-Crafts type catalyst to eliminate hydrogen atoms from aromatic nuclei of said aromatic polymer and methoxy groups from said p-dimethoxyxylene as methanol whereby a cross-linked polymer is produced with the remaining part of the p-dimethoxyxylylene cross-linked directly between aromatic nuclei in the polymer.

2. A process according to claim 1 in which stannic chloride is present as a Friedel-Crafts type catalyst in a concentration of less than 10% by weight based on the total weight of the reactants.

3. An aromatic cross-linked polymer produced by a process according to claim 1.

4. A process for the manufacture of a cross-linked polymer which comprises a first stage of heating at a temperature of between about 80° and 250° C. an aralkyl compound selected from the group consisting of p-dimethoxyxylylene, 4,4' - di(methoxymethyl)diphenyl ether, p-dichloroxylylylene, p-dibromoxylylene and p-diiodoxylylene and an aromatic compound which is selected from the group consisting of a lower polyphenyl, a fused ring aromatic compound, diphenyl ether, diphenylene ether, phenyl phosphate, a low molecular weight aryl siloxane, an aryl substituted borazole, a ferrocene compound and carbazole in contact with a catalytically effective amount of a Friedel-Crafts type catalyst to eliminate hydrogen atoms from the aromatic nuclei in the aromatic compound and methovy groups or halogen atoms respectively from the aralkyl compound as methanol or hydrogen halide to form a tractable low molecular weight aromatic polymer having an average molecular weight of less than about 20,000 and having a degree of polymerization between about 5 and 15 by interlinking the remaining part of the aralkyl compound between aromatic nuclei in different molecules of the compound; and a second stage which comprises heating at a temperature of between about 150° C. and 400° C. the said tractable polymer with p-dimethovy xylylene in contact with a catalytically effective amount of a Friedel-Crafts type catalyst to eliminate hydrogen atoms from aromatic nuclei in the tractable polymer and methoxy groups from the p-dimethoxy xylylene as methanol whereby a cross-linked polymer is produced with the remaining part of the aralkyl ether cross-linked directly between aromatic nuclei in the polymer.

5. A process according to claim 4, in which the aralkyl compound used in the first stage is p-di(methoxy) xylylene.

6. A process according to claim 4, in which the xylylene derivative used in the first stage is p-dichloroxylylene.

7. A process according to claim 5, in which stannic chloride is present as a Friedel-Crafts catalyst in a concentration of less than 10% by weight based on the total weight of the reactants.

8. An aromatic cross-linked polymer produced by a process according to claim 4.

References Cited

UNITED STATES PATENTS

| | | | |
|---|---|---|---|
| 3,170,959 | 2/1965 | Trapp | 260—613 |
| 3,274,157 | 9/1966 | Doedens | 260—47 |
| 3,316,186 | 4/1967 | Geyer et al. | 260—2.1 |
| 3,405,091 | 10/1968 | Sprengling et al. | 260—47 |

DONALD E. CZAJA, Primary Examiner

M. I. MARQUIS, Assistant Examiner

U.S. Cl. X.R.

117—126, 161; 260—2, 4.65, 37, 88.5, 93.5